Sept. 28, 1965 S. A. WEIL ET AL 3,208,247
GAS BURNER
Filed May 14, 1962
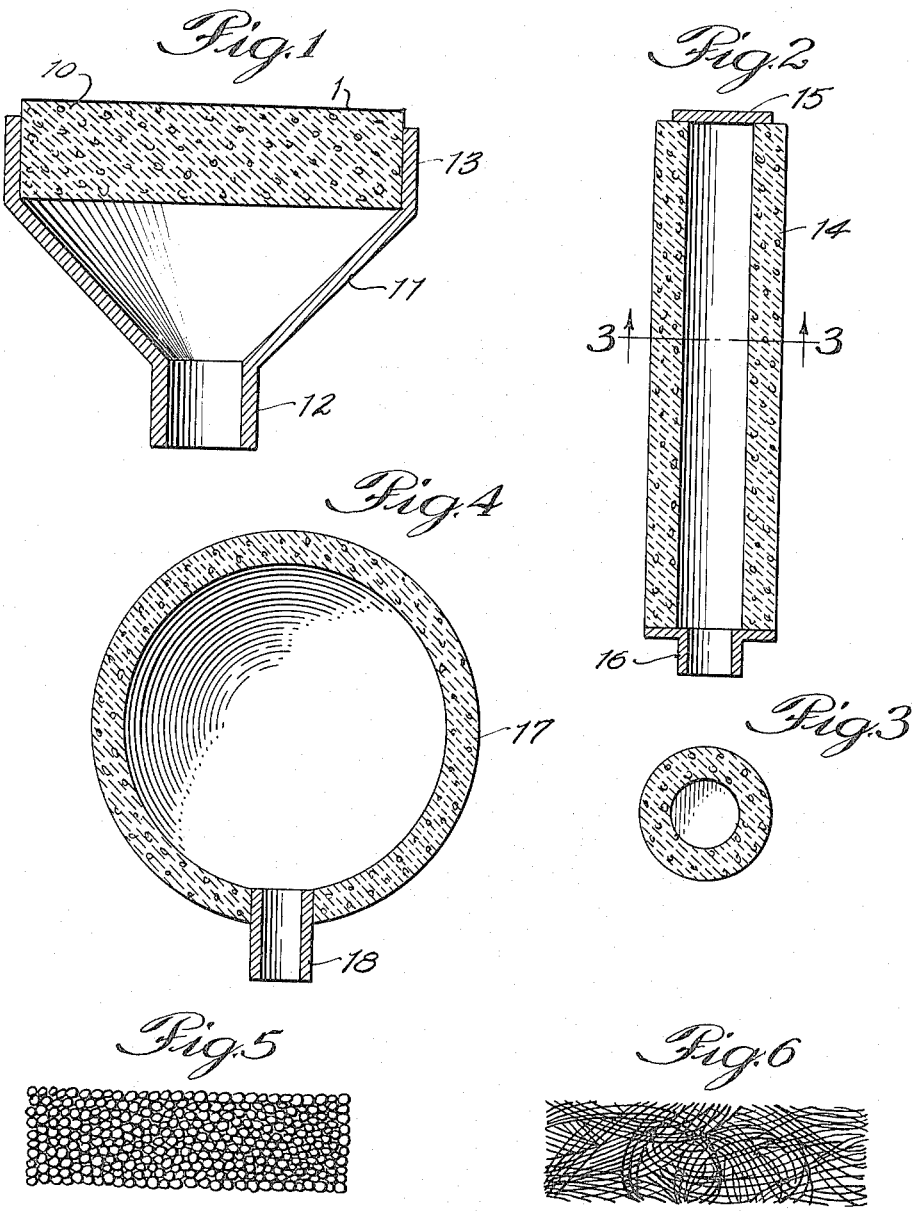
INVENTORS:
Sanford A. Weil
and Jack M. Reid,
BY Pair Freeman & Molinare
ATTORNEYS.

United States Patent Office 3,208,247
Patented Sept. 28, 1965

3,208,247
GAS BURNER
Sanford A. Weil, Chicago, and Jack M. Reid, Villa Park,
Ill., assignors to Institute of Gas Technology, Chicago,
Ill., a corporation of Illinois
Filed May 14, 1962, Ser. No. 194,503
4 Claims. (Cl. 67—88)

This invention relates to a burner for producing illumination by gas combustion and more particularly to the production of efficient illumination by the combustion of conventional fuel gas.

Most combustible fuel gases, such as natural gas, carbureted water gas or oil gas, burn with a flame too low in luminosity to be useful as a source of light. When visible radiation is the desired product from combustion of a fuel gas, it is customary to employ a mantle. This is a body of ceramic or refractory material which when heated by the gas flame becomes incandescent and emits light. The amount of light produced by the mantle is a function of the effectiveness with which it is heated by the gas flame and the spectral emission characteristics of the material of which it is made. The most suitable spectral emission characteristics known for this purpose are possessed by a mixture of the oxide of thorium and cerium in a weight ratio of approximately 99:1. Mantles for light production are made from this mixture.

The conventional mantle is made in a form which resembles a thin, loosely woven fabric. This fabric-like structure is in the shape of an envelope that conforms to the size and shape of the gas flame and is positioned so that it encloses the flame. Effective heating of the mantle is thus obtained by contact between the flame and the inside of the mantle and by passage of the hot combustion gases out through the small openings between the threads of the fabric-like structure. The threads that form the fabric-like structure must be very small in diameter to insure that they will be heated to the maximum possible temperature. Although the conventional mantle produces a sufficient amount of visible radiation to be useful as a light source, the thin fabric-like structure is extremely fragile, and in fact, the chief disadvantage is its susceptibility to disintegration or damage in service from mechanical shock, vibration, wind and other disturbances. Such factors that are commonly encountered in the operation and use of a light source frequently cause failure of the mantle so as to render it unfit after a relatively short time.

According to the well known laws of thermal radiation, the total amount of radiation emitted by a body will be a function on the order of the fourth power of the temperature to which the body is heated. This energy will be distributed over a range of wave lengths in a manner that is characteristic of the chemical composition of the material of which the body is composed. For any material, however, the amount of energy emitted in the visible portion of the spectrum increases more rapidly with increase in temperature than that emitted in the longer wave length (infrared) portion of the spectrum. Thus, if only the visible radiation is considered, the amount emitted will vary with temperature at a rate much greater than the fourth power of the temperature when the body is heated to relatively high temperatures. For example, at 1800° Kelvin, the amount of visible radiation emitted by a body will vary about as the thirteenth power of its temperature. It can be seen, therefore, that the effectiveness of a mantle as a source of light is highly dependent on the temperature to which it is heated by the gas flame.

The mantle cannot, of course, be heated to a higher temperature than the temperature of the gas flame. In practice, the mantle will achieve a temperature lower than the flame temperature by an amount dependent on the heat losses from the system. These losses may be comprised of radiation heat losses, convection heat losses and conduction heat losses. The radiation losses, as indicated above, are dependent on the chemical composition of the material from which the mantle is composed. To reduce this loss would require the use of a material with a higher ratio of visible to nonvisible radiant emission than a mixture of the oxides of thorium and cerium (99:1 weight ratio) and no such material is known to exist. The conduction losses are dependent on the physical characteristics of the mantle and its connection to cooler bodies such as supporting means and the like. The convection losses are dependent both on the physical characteristics of the mantle and on the flow path of the hot combustion gases with respect to the mantle. These losses are kept relatively low in the conventional mantle by using small diameter threads in the fabric-like structure and positioning the mantle so that the flame and hot combustion gases must pass about the threads and through the small openings between them. Conduction of heat along the length of the thread toward the cooler portion is inversely proportional to the cross-sectional area of the thread, thus the smaller the diameter the lower the conduction loss. Also, since the surface area to volume of the thread increases as the diameter decreases, a greater surface is available for convection transfer of heat from the flame to the thread in proportion to the mass of material that is losing heat by radiation. It is not practical to further reduce conduction and convection losses in the conventional mantle by use of smaller diameter threads since the already fragile structure would be further weakened.

It is accordingly an object of the present invention to provide a burner for production of illumination by gas combustion in which visible radiations are produced efficiently without encountering undesired residual of gas mantles.

Another object is to provide a burner for production of illumination by gas combustion in which convection and conduction losses are minimized so that the radiating medium is heated to maximum temperature to produce maximum quantity of visible radiations.

A further object is to provide a burner which can be made of substantially any desired shape without being required to conform to the shape of a gas flame.

According to a feature of the invention, the burner comprises a relatively thick plate or sheet of porous ceramic, preferably thorium oxide, with a thin layer at its outer surface formed by a mixture of thorium oxide and cerium oxide and the gas flows from and burns on the outer surface of the sheet or plate.

The above and other objects and features of the invention will be more readily apparent from the following description when read in connection with the accompanying drawings, in which:

FIG. 1 is a sectional view of one form of burner embodying the invention;

FIG. 2 is a similar view of an alternative form of burner;

FIG. 3 is a section on the line 3—3 of FIG. 2;

FIG. 4 is a sectional view of still another form of burner embodying the invention; and FIGS. 5 and 6 are enlarged detail views showing the construction of the porous sheet or plate.

The essential feature of the burner of the present invention comprises a thick, light weight porous body of ceramic material, preferably thorium oxide, through which a combustible gas mixture flows to burn on the outer surface of the body. The outer surface of the body is formed of a mixture of thorium oxide and cerium oxide, preferably in a weight ratio of approximately 99:1, and as the gas mixture burns at the surface it heats the outer layer to produce maximum radiation of illumination therefrom.

The porous body may take several different forms, two of which are illustrated, for example, in FIGS. 5 and 6. As shown in FIG. 5, the body has a foam-like structure formed of a series of thin walled bubbles adhered together. This structure may be formed by absorbing a solution of a water soluble thorium salt, such as thorium nitrate, in a combustible material having the desired physical structure, such as sponge foam or felt. The material may then be heated to a sufficiently high temperature in a furnace, or the like, to burn out the combustible material and to convert the thorium solution to a residue of thorium oxide with a porous structure conforming to that of the original combustible material. The heating process is preferably carried out at a temperature slightly below the melting point of the thorium oxide (5486° F.) so that the residual thorium oxide will sinter to form a body of relatively high strength.

Alternatively, thorium oxide may be heated to above its melting point and foamed by injection of gas into the melt and then allowed to solidify. This alternative process will produce a porous physical structure substantially as shown in FIG. 5 consisting of a plurality of relatively thin walled bubbles connected together into a unit.

Instead of a foam structure, as shown in FIG. 5, fibers of thorium oxide may be formed by injecting molten thorium oxide into a high velocity gas jet. The fibers may be collected and formed into the desired porous shape and then elevated to a sintering temperature slightly below the melting point of the thorium oxide to connect the fibers into a felted body substantially as shown in FIG. 6. In either case, the wall thickness of the bubbles or cells, or the diameter of the fibers, is made very small, preferably less than about 0.005 inch to provide a body with a high gas permeability, relatively high strength and low thermal conductivity.

After completion of the thorium oxide body, as described above, a relatively thin layer 1 at the outer surface thereof is mixed with cerium oxide. One desirable method of accomplishing this is to deposit a cerium salt, such as cerium nitrate, in a thin layer at one surface of the body as by dipping the surface of the body in a solution of the cerium salt. After dipping the body is air dried at an elevated temperature of about 1000° F. to decompose the cerium salt to cerium oxide and leave the cerium oxide mixture with the thorium oxide at the outer surface of the body.

FIGS. 1 to 4 illustrate various forms of burners which can be formed according to the invention and utilizing porous ceramic bodies, as described above. In FIG. 1, the porous ceramic body takes the form of a relatively thick flat plate 10 which may be circular, or of other desired configuration. The plate is supported in a cup-shaped housing 11 having a connection 12 at one end for admission of a combustible gas and air mixture. Preferably the cup-shaped body is provided with an annular outer flange 13 encircling the outer edge of the disc 10 to prevent gas from flowing through the sides of the disc.

The thickness of the disc 10 is dependent upon the thermal conductivity of the body and is adjusted by design so that the inner surface of the body will be maintained at a relatively low temperature during operation. It has been found that with constructions, as shown in FIG. 1, the temperatures at the inner surface of the body may be maintained as low as 100° F., although temperatures on the order of 200–300° F. are reasonably satisfactory. The thickness of the disc is preferably not less than about ¼ inch in order that the disc will have a relatively high mechanical strength even apart from the insulating factors. By maintaining the inner surface of the disc relatively cool, radiation therefrom is minimized so that greater efficiency will result.

In operation, the combustible mixture of gas and air flows from the cup-shaped body through the disc 10 and is ignited at the outer face of the disc. As the temperature of the disc face increases, the flame will flash back to the surface of the disc and combustion will occur thereafter on the surface. This will cause the surface layer 1 of the disc to increase to a high temperature at which it will glow brightly to produce a maximum output of visible light. Preferably the surface layer of the body will approach a temperature on the order of 2000° K.

Because the relatively cool gas-air mixture passes through the body from face to face, convection heat losses are eliminated except from the front face of the body. Conduction losses are also minimized by reason of the thickness and low thermal conductivity of the material of the body. Invisible radiation losses from either face of the body are kept extremely low because of the low emissivity of thorium oxide. The heating of the luminous face of the body is at maximum effectiveness because combustion occurs at this point and heat transfer has been observed to occur at rates substantially higher than when a solid is heated by contact with a flame or with hot combustion gases.

FIGS. 2 and 3 illustrate an alternative construction formed of the same materials as the burner of FIG. 1, but taking a different configuration. In this construction, the porous ceramic body is in the form of a tube 14 which is closed at one end by a closure plate 15 and which is provided at its opposite end with a nipple connection 16 for supply of a combustible mixture to its interior. In this construction, the gas flowing into the interior of the tube passes outwardly through the walls thereof and burns at the outer coated surface thereof to produce efficient illumination at the outer surface. In this construction, the tube walls may be made relatively thin as compared to the disc of FIG. 1 because any radiations emitted from the interior surface will be absorbed by the opposite interior surface and will not be lost.

Still another form of burner is illustrated in FIG. 4 in which the ceramic body is in a substantially spherical form, as indicated at 17. A gas supply nipple, or conduit, 18 extends into the spherical body at one point to supply a combustible gas mixture to the interior thereof. The gas supplied to the interior of the body will pass through the porous walls thereof and will burn on the outer coated surface, as in the previous embodiments. Again, as in the case of the tubular construction of FIGS. 2 and 3, the walls may be made relatively thin consistent with mechanical strength since any radiation from the interior walls will not be lost, but will be absorbed by opposite surfaces.

It will readily be seen that burners embodying the present invention can be made in substantially any desired shape and can have a mechanical thickness sufficient to produce high mechanical strength. At the same time, losses due to conduction, convection or radiation will be minimized so that the incandescent thin layer at the outer surface of the porous ceramic body will be raised to maximum temperature and will produce the maximum amount of illumination.

While several embodiments of the invention have been shown and described herein, it will be understood that they are illustrative only and not to be taken as a definition of the scope of the invention, reference being had for this purpose to the appended claims.

What is claimed is:

1. A burner for producing illumination by gas combustion comprising a porous sheet of uniform thickness formed of thorium oxide and having cerium oxide mixed therewith in a thin layer at one face of the sheet, and conduit means to conduct a combustible gas mixture to the other face of the sheet, the gas mixture flowing through the sheet and burning at said one face thereof to heat said face.

2. The burner of claim 1 in which the porous plate is formed of thin particles of thorium oxide sintered together and a thin layer at the outer face only thereof has cerium oxide mixed therewith.

3. The burner of claim 1 in which the sheet is formed of a series of thin walled bubbles of thorium oxide adhered together.

4. The burner of claim 1 in which the sheet is formed of a series of elongated fibers of thorium oxide adhered together at spaced points.

References Cited by the Examiner

UNITED STATES PATENTS

| 1,256,301 | 2/18 | Ellis | 158—99 |
| 1,683,375 | 9/28 | Wiederhold | 126—92 |
| 3,057,400 | 10/62 | Wagner | 150—99 |

FOREIGN PATENTS

| 471,656 | 7/14 | France. |
| 1,056,454 | 10/53 | France. |
| 659,698 | 5/38 | Germany. |

JAMES W. WESTHAVER, *Primary Examiner.*
FREDERICK L. MATTESON, JR., *Examiner.*